(12) United States Patent
Kawasaki et al.

(10) Patent No.: US 6,480,303 B1
(45) Date of Patent: Nov. 12, 2002

(54) LIGHT AMOUNT DISTRIBUTION CONTROL DEVICE

(75) Inventors: Kazuo Kawasaki; Nobuyuki Nagai, both of Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 902 days.

(21) Appl. No.: 08/703,659

(22) Filed: Aug. 27, 1996

(30) Foreign Application Priority Data

Aug. 28, 1995 (JP) ............................................. 7-242511

(51) Int. Cl.⁷ ................................................. H04N 1/04
(52) U.S. Cl. ........................ 358/474; 358/475; 358/483
(58) Field of Search ................................. 358/474, 475, 358/494, 496, 482, 483; 359/883, 884

(56) References Cited

U.S. PATENT DOCUMENTS

| | | | | |
|---|---|---|---|---|
| 4,595,290 A | * | 6/1986 | Nose et al. .................. | 356/225 |
| 4,959,736 A | * | 9/1990 | Mino et al. .................. | 358/474 |
| 5,009,472 A | | 4/1991 | Morimoto | |
| 5,066,987 A | | 11/1991 | Minefuji et al. | |
| 5,430,285 A | * | 7/1995 | Karpen et al. .............. | 235/472 |
| 5,486,688 A | | 1/1996 | Iima et al. | |

FOREIGN PATENT DOCUMENTS

| | | |
|---|---|---|
| JP | 5965831 | 4/1984 |
| JP | 5-182005 | 7/1993 |

* cited by examiner

*Primary Examiner*—Mark Wallerson
(74) *Attorney, Agent, or Firm*—Greenblum & Bernstein, P.L.C.

(57) ABSTRACT

A light amount distribution control device has a reflecting sheet by which light irradiated by LEDs is reflected and is radiated onto an object to be read. The light reflected by the object is made incident onto a line sensor to sense an image formed on the object. The reflecting sheet has a color distribution in which a white component increases from the center of the reflecting sheet towards the ends of the reflecting sheet. The reflecting ratio of the reflecting sheet is controlled along the longitudinal direction.

6 Claims, 4 Drawing Sheets

LIGHT AMOUNT DISTRIBUTION CONTROL DEVICE

BACKGROUND OF THE INVENTION

1. Field of the Invention

The present invention relates to an optical reader by which light reflected by an object is radiated on a sensor so that an image formed on the object is sensed. The optical reader is mounted in a copy machine, a facsimile machine and the like.

2. Description of the Related Art

In a conventional optical reader, a surface of an object to be read is illuminated by a light source such as an LED (light emitting diode). The light reflected by the object is focused on a CCD (charge coupled device) line sensor and the like by an imaging lens. Image information formed on the object is sensed by the line sensor. Signals corresponding to the image information are output from the line sensor, and transmitted to a signal processing unit.

In the conventional optical reader, the object is uniformly illuminated by the light source. Therefore, the amount of light received by the end portions of the line sensor is low in comparison with the center portion thereof due to a reduction in the amount of light passing through the imaging lens, in relation to the $\cos^4$ law. If the distribution of the amount of light in the optical image formed on the line sensor is non-uniform, the image information formed on the object can not be sensed with high accuracy.

To reduce the deviation in the light amount distribution, conventionally, there is a device in which a restriction plate is placed between the imaging lens and the line sensor, for example, so that the amount of light radiated on the center portion of the line sensor is reduced. In such a device, however, since an amount of light entering the line sensor is also reduced, the signal to noise ratio of an electric signal outputted by the line sensor is deteriorated. A precise image can not thus be sensed by the line sensor.

In another device, the amount of light provided by the light source (i.e., LEDs) is variable, and is controlled so that the amount of light at the center portion of the line sensor is reduced. However, such a device is complex and the manufacturing process is cumbersome.

SUMMARY OF THE INVENTION

Therefore, an object of the invention is to provide a light amount distribution control device which has a simple structure and causes a distribution of an amount of light received by a line sensor to become uniform without reducing the amount of light received by the line sensor, so that the image can be sensed with high accuracy.

According to the present invention, there is provided a light amount distribution control device, the device comprising light irradiating means and an elongated reflecting member reflecting light irradiated by the irradiating means to lead the light onto an object. A reflecting ratio of each portion of the reflecting member is changed along the longitudinal direction thereof.

Further, according to the present invention, there is provided an optical reader comprising a light source, an elongated reflecting member, an image forming optical system and reading means. In the reflecting member, a reflecting ratio is higher towards the ends of the reflecting member along the longitudinal direction of the reflecting member. Light irradiated by the light source is reflected by the reflecting member and illuminating an object to be read. The image forming optical system leads light reflected by the reflecting member and the object to an image plane. The reading means reads information formed on the object by sensing the light reflected by the reflecting member and the object. The reading means is provided on the image plane.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
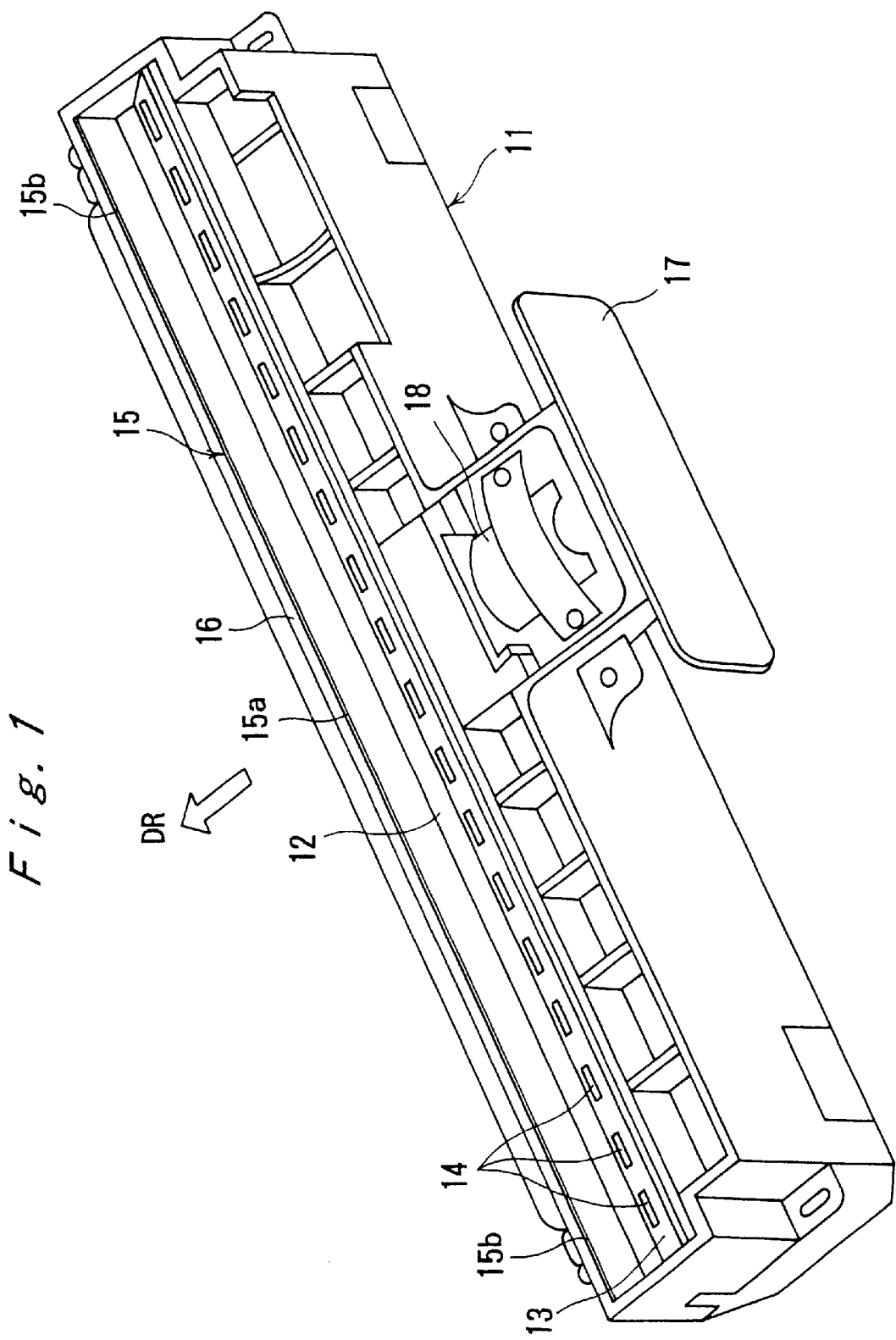
FIG. 1 is a perspective view showing an optical reader to which a first embodiment of the present invention is applied.

The present invention will be described below with reference to embodiments shown in the drawings.

Figure 2:
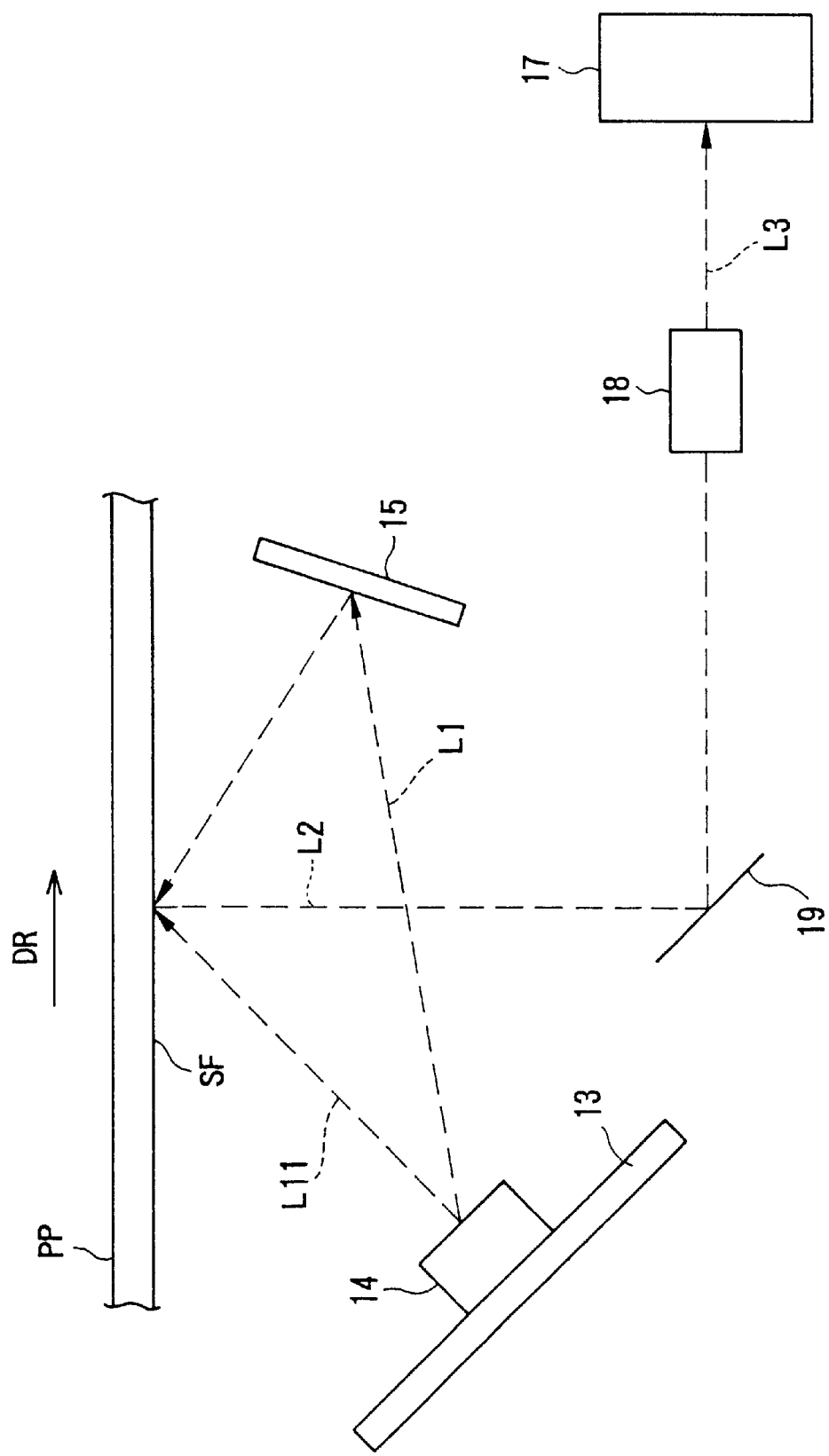
FIG. 2 is a schematic view showing a state in which light irradiated by an LED is reflected.

FIGS. 1 and 2 show an optical reader to which a first embodiment of the present invention is applied. This optical reader is provided in a facsimile machine or a copy machine, for example, to read image information formed on a sheet of paper.

A casing 11 has an elongated box-shape and has an elongated opening 12. A rectangular support plate 13 is disposed along one side wall enclosing the opening 12, and is extended along the opening 12. A plurality of LEDs 14, which act as light sources, are fixed to the support plate 13 and aligned in a row along the opening 12. A reflecting sheet 15 is applied to a side wall 16 facing the support plate 13. The reflecting sheet 15 has an elongated rectangular shape which is approximately the same shape as that of the side wall 16.

The LEDs 14 are arranged along the longitudinal direction of the reflecting sheet 15, and are disposed at a constant interval. Each of the LEDs 14 irradiates light having the same luminous intensity. The LEDs 14 are arranged in parallel to a reading line of a sheet of paper (not shown in FIG. 1), which is an object to be read and is fed over the opening 12.

As shown in FIG. 2, when a sheet of paper PP is fed in a horizontal direction DR, the LED 14 and the reflecting sheet 15 are inclined relative to the horizontal direction so that light L1 irradiated by the LED 14 is reflected by the reflecting sheet 15 onto a surface SF of the sheet of paper PP. The light L2 reflected by the surface SF is reflected by a mirror 19 to a CCD line sensor 17 through an imaging lens 18. A part L11 of the light L1 irradiated by the LED 14 is directly led to the sheet of paper PP. Not that, in FIG. 2, the longitudinal direction of the reflecting sheet 15 is into the drawing, and the direction DR is perpendicular to the longitudinal direction.

Referring again to FIG. 1, the line sensor 17, the longitudinal direction of which is parallel to the longitudinal direction of the reflecting sheet 15, is mounted outside the casing 11. The focusing lens 18 is provided in front of the line sensor 17 to face the mirror 19. The reflecting ratio of each portion of the reflecting sheet 15 is changed along the longitudinal direction thereof, so that an amount of light L3, which is reflected by the sheet of paper PP and converged by the imaging lens 18 onto the line sensor 17, is substantially uniform along the longitudinal direction of the line sensor 17. Namely, a color coating is applied to the surface of the reflecting sheet 15 such that, in a color distribution of the reflecting sheet 15, a white component increases from the center 15a of the reflecting sheet 15 to the ends 15b of the reflecting sheet 15. In other words, the color of the reflecting sheet 15 becomes more white towards the ends 15b of the sheet 15.

In an alternative construction, the side wall can be coated with a reflecting layer or material on which the white component increases towards the ends 15b of the side wall 16.

Figure 3:
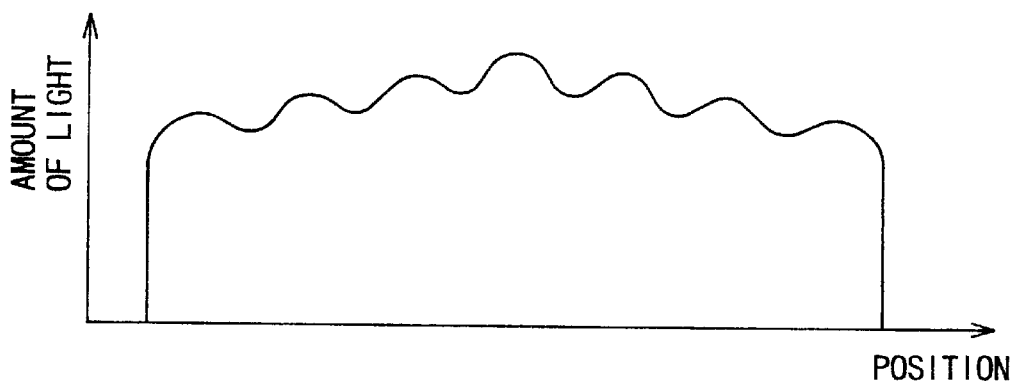
FIG. 3 is a graph showing a distribution of an amount of light on the line sensor when a reflecting sheet is not provided.

FIG. 3 shows a distribution of an amount of light on the line sensor 17 when the reflecting sheet 15 is not provided. As shown in this drawing, the amount of light received by the line sensor 17 is less at the ends in comparison with the center portion when the sheet of paper is uniformly illuminated.

Figure 4:
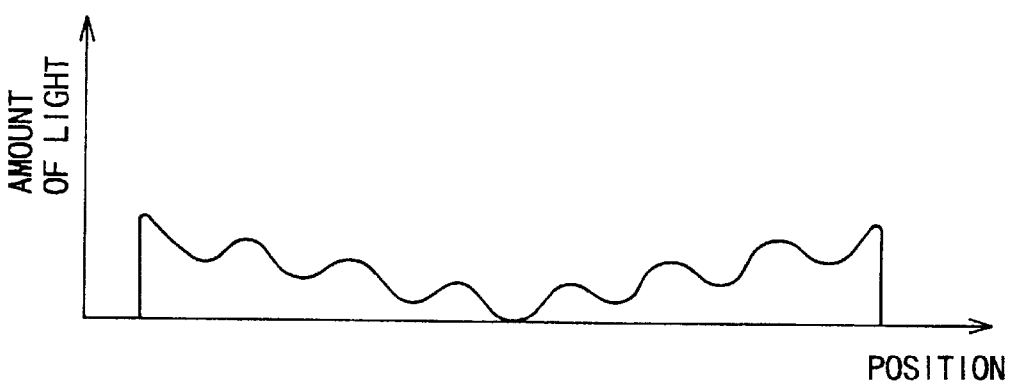
FIG. 4 is a graph showing a distribution of an amount of light on the line sensor when the light is reflected by the reflecting sheet and an object to be read, an enters the line sensor.

FIG. 4 shows a distribution of an amount of light on the line sensor 17 when the light is reflected by the reflecting sheet 15 and the surface of the sheet of paper PP. Namely, the light does not include light that directly enters the line sensor 17 without being reflected by the reflecting sheet 15. The reflecting ratio of the reflecting sheet 15 becomes higher towards the ends 15b, and therefore, the amount of light received by the line sensor 17 is greater towards the ends.

Figure 5:
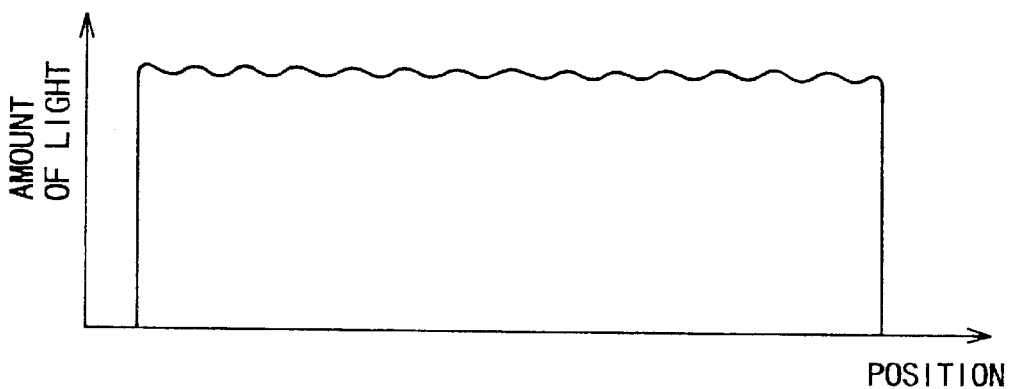
FIG. 5 is a graph showing a sum of light directly radiated onto the object and entering the line sensor and light reflected by the reflecting member, radiated onto the object and entering the line sensor.

FIG. 5 shows a sum of the light which directly radiates the sheet of paper PP and enters the line sensor 17 (direct light), and the light which is reflected by the reflecting sheet 15 and radiated onto the sheet of paper PP before entering the line sensor 17 (reflected light). Namely, this drawing shows a distribution of an amount of the reflected light and the direct light received by the line sensor 17. Although, when the reflecting sheet 15 is not provided, the light distribution on the line sensor 17 decreases towards the ends as shown in FIG. 3, the light amount in the end portions of the line sensor 17 increases as shown in FIG. 4, due to the reflecting effect of the reflecting sheet 15. Therefore, light is led onto the line sensor 17 uniformly over the longitudinal direction of the line sensor 17 without reducing the amount of light outputted from the LEDs 14, so that an image formed on the sheet of paper can be sensed with high accuracy.

Figure 6:
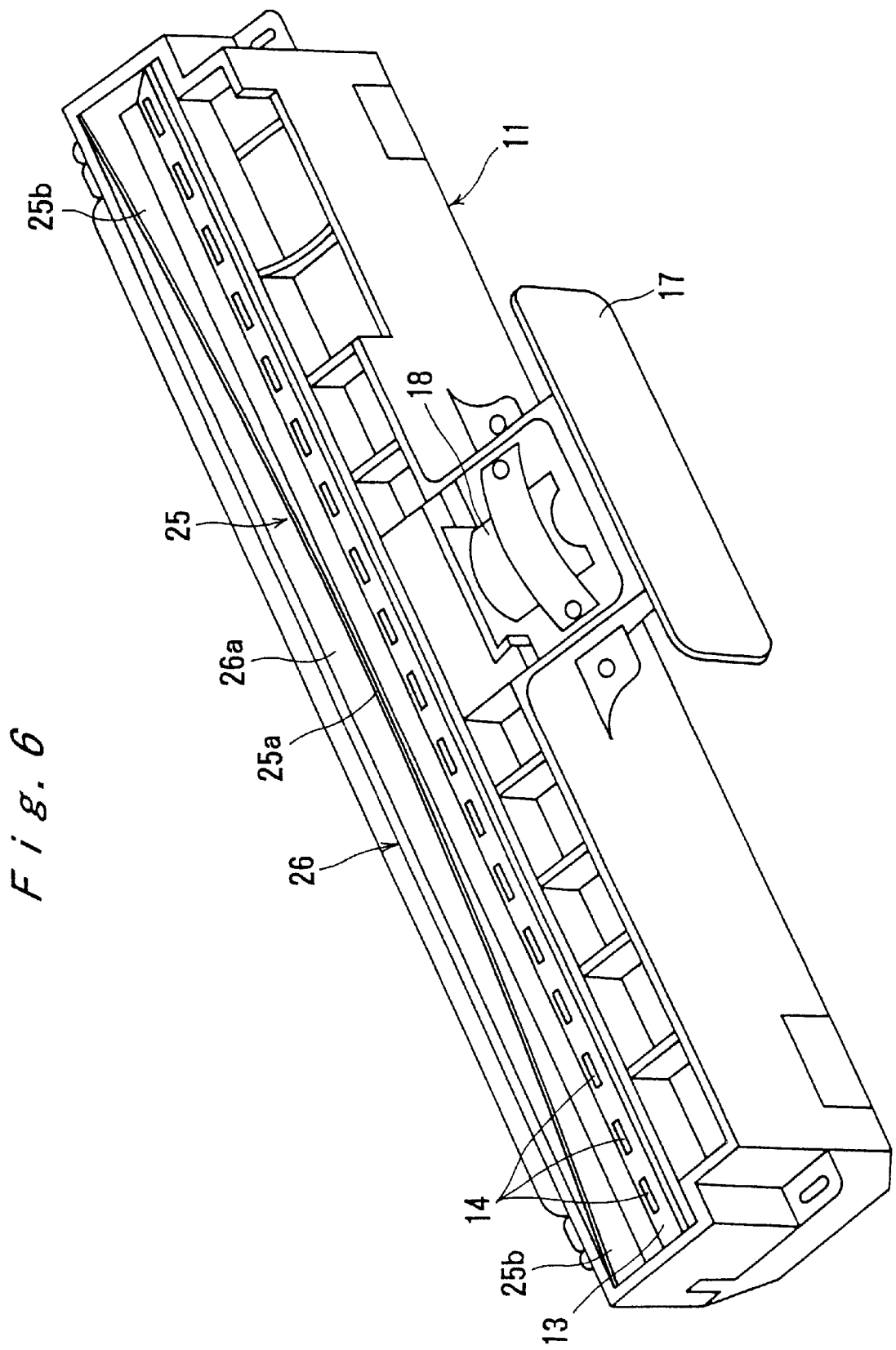
FIG. 6 is a perspective view showing an optical reader to which a second embodiment of the present invention is applied.

FIG. 6 shows a second embodiment of the present invention.

The reflecting sheet 25 is constructed such that a reflecting surface becomes larger from the center 25a towards the ends 25b of the reflecting sheet 25. Namely, a width of the reflecting sheet 25 becomes wider from the center 25a towards the ends 25b of the reflecting sheet 25. The inner surface 26a of the side wall 26 is black so that light irradiated by the LEDs 14 is hardly reflected by the inner surface 26a.

According to the second embodiment, similarly to the first embodiment, a distribution of an amount of light, which is reflected by the reflecting sheet 26 and radiated onto the line sensor 17, is that shown in FIG. 4. Therefore, light is led onto the line sensor 17 uniformly over the longitudinal direction of the line sensor 17 without reducing the amount of light outputted from the LEDs 14, as shown in FIG. 5.

Note that the LEDs 14 may be disposed in such a manner that a distance between two adjacent LEDs 14 is shorter as the LEDs 14 become closer to the ends of the reflecting sheet.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-242511 (filed on Aug. 28, 1995) which is expressly incorporated herein by reference, in its entirety.

What is claimed is:

1. An optical reader, comprising:

a light source;

an elongated reflecting member in which a reflecting ratio is higher towards ends of a surface of said reflecting member along the longitudinal direction of said reflecting member than at a central portion of said reflecting member, a portion of light irradiated by said light source being reflected by said reflecting member and illuminating an object to be read;

another portion of said light illuminating said object directly;

an image forming optical system leading light reflected by said object to an image plane; and a sensor comprising a light receiving surface, said sensor reading information formed on said object by sensing said light reflected by said object, the distribution of the light reflected by said object being substantially uniform on the light receiving surface of said sensor, said sensor being provided on said image plane.

2. A device according to claim 1, wherein said sensor comprises a line sensor, the longitudinal direction of said line sensor being parallel to the longitudinal direction of said reflecting member.

3. A device according to claim 1, wherein said reflecting member has a color distribution in which a white component increases from the center of said reflecting member towards the ends of said reflecting member.

4. A device according to claim 1, wherein said reflecting member has a reflecting surface, said reflecting surface becoming larger from the center of said reflecting member towards the ends of said reflecting member.

5. A device according to claim 1, wherein a width of said reflecting member becomes wider from the center of said reflecting member towards the ends of said reflecting member.

6. A device according to claim 1, wherein said reflecting member reflects light outputted by said light source in such a manner that an amount of light converged by said image forming optical system onto said sensor is substantially uniform along the longitudinal direction of said reading means.

* * * * *